Nov. 17, 1925.  
D. W. JONES  
CHAIN COUPLING  
Filed July 23, 1924.  
1,561,787

Inventor  
David W. Jones  
By Chas. C. Billman, Attorney

Patented Nov. 17, 1925.

1,561,787

UNITED STATES PATENT OFFICE.

DAVID W. JONES, OF CLEVELAND, OHIO, ASSIGNOR TO DAVID ROUND & SON, OF CLEVELAND, OHIO.

CHAIN COUPLING.

Application filed July 23, 1924. Serial No. 727,650.

*To all whom it may concern:*

Be it known that I, DAVID W. JONES, a citizen of the United States, residing at Cleveland, in the county of Cuyahoga and State of Ohio, have invented certain new and useful Improvements in Chain Couplings, of which the following is a specification.

My invention relates to improvements in chain couplings or shackles, the present embodiment of the invention relating more particularly to an improved chain shackle or clevis adapted to be readily attached to a cross head and load supporting member or hook swivelled therein and particularly one which may be readily attached to or detached from the ordinary link of the standard hoist chain through the medium of an improved longitudinally elongated shackle head or body provided with a link receiving slot or pocket extending therethrough, the walls of the pocket or slot being so shaped and the relative position of the link securing attaching element or bolt being such as to support the connected link in an upright centralized position when the links of the connected chain are relaxed.

The primary object of the invention is to provide a generally improved chain coupling or shackle of the class indicated, which will be exceedingly simple in construction, cheap of manufacture, and efficient in use.

A further and very important object is the provision of an improved coupling or shackle between the swivelled load carrying member or hook and the hoist chain having its parts so arranged and disposed relative to each other as to maintain the connections in a centralized position at all times and thus uniformly distribute the load carrying stresses, thereby giving a maximum of strength with a minimum liability to distortion or breakage of parts while in service.

With the above mentioned and other ends in view, the invention consists in the novel construction, arrangement and combination of parts, hereinafter described, illustrated in one of its embodiments in the accompanying drawings, and particularly pointed out in the appended claims.

Figure 1:
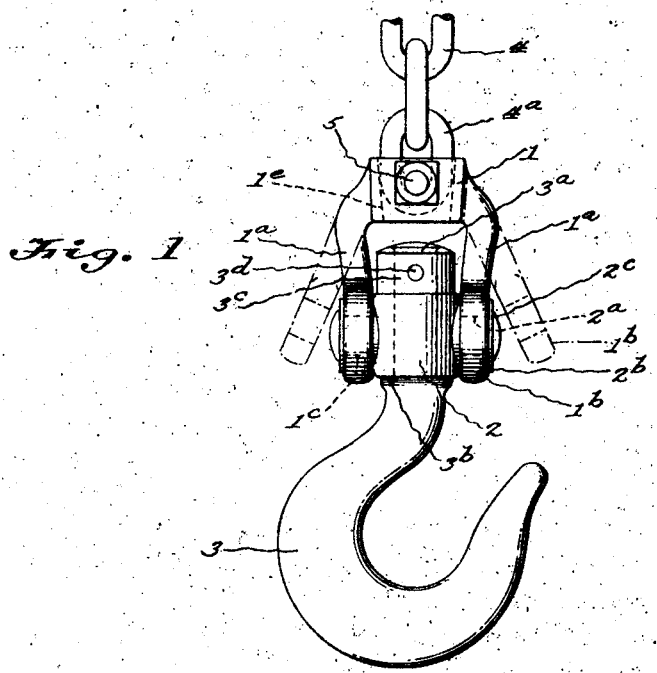

Referring to the drawings, forming a part of this specification, Figure 1 is a side elevation of a chain coupling or shackle, constructed in accordance with this invention, the dotted lines indicating the normal position of the bendable arms of the shackle preparatory to assembling or being secured to the trunnions of the swivel supporting cross head.

Figure 2:
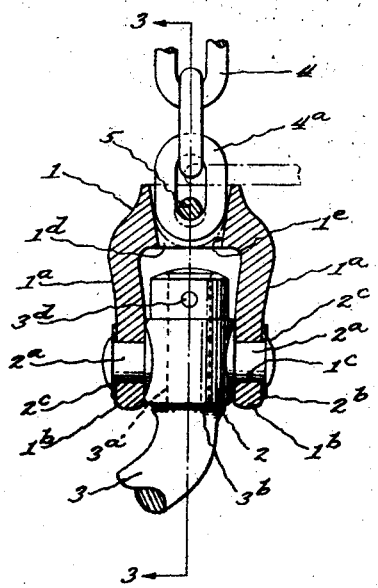

Fig. 2, a central logitudinal view of the shackle or clevis, the dotted lines illustrating how the second link of the relaxed chain may swing to one side or the other while the connected link is retained in an upright or centralized position in the improved link receiving pocket or slot.

Figure 3:
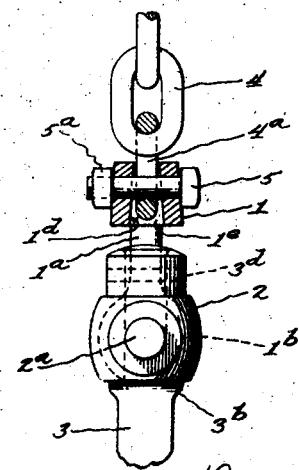

Fig. 3, a central longitudinal sectional view, taken on line 3—3 of Fig. 2.

Similar numerals of reference designate like parts throughout all the figures of the drawings.

The improved coupling or connection comprises a shackle or clevis provided with a main body portion 1, preferably longitudinally elongated as shown, and provided with inwardly converging arms 1ª, terminating in loop eyes 1ᵇ, the latter affording bearing openings 1ᶜ, to receive and carry the bearing trunnions of the swivel connecting or supporting cross head hereinafter referred to.

The swivel connecting cross head comprises a main body or sleeve portion 2 and provided with integral bearing trunnions 2ª.

As a means of assembling and securing the arms 1ª of the shackle member to the trunnions of the cross head, the arms of the shackle are preferably formed as indicated by dotted lines in Fig. 1 of the drawings, and after the trunnions of the cross head are brought into proper relation the arms are moved or closed toward each other over such trunnions, as shown. As a means of securing the bearing trunnions in position, washer members 2ᵇ, are placed over the outer ends of the trunnions to bear against the outer sides of the loop eyes 1ᵇ and the ends of the trunnions are upset as at 2ᶜ to hold the parts in closely assembled relation to each other.

The load supporting member or hook 3, is provided with a shank 3ª, extending upwardly through the opening in the cross head or sleeve 2, the shank being preferably reduced to afford a shoulder 3ᵇ, and the upper end of the shank 3ª being provided with a bearing head 3ᶜ, secured by means of a cross pin 3ᵈ, so that as the hook 3 swivels in the cross head the bearing head will rotate therewith in frictional engagement with the adjacent surface of the cross head.

The body 1 of the shackle is provided with a link receiving pocket or slot provided with sides and ends 1ᵈ and 1ᵉ diverging and converging, respectively, to receive and support a chain link 4ª, of an ordinary chain 4. It will be seen that the pocket or slot extends entirely through the head 1 of the shackle and centrally and longitudinally thereof and that the inwardly converging ends 1ᵉ are adapted to engage with the ends and sides of the connected link to support the latter in an upright centralized position when the chain is relaxed and to permit the next link to swing freely to one side or the other, as indicated by dotted lines in Fig. 2 of the drawings.

The chain link 4ª may be readily attached or detached through the medium of a link attaching element or cross bolt 5, extending through the sides of the shackle body, said bolt in the present instance being provided with a nut 5ª, and it will be apparent that by reason of the construction and arrangement of parts when the chain and load supporting swivel members are drawn taut, or are under load, all of the connections will be centralized and the load stresses equalized.

Having thus described one of the embodiments of my invention, without having attempted to set forth all the forms in which it may be made, or all the modes of its use, what I claim and desire to secure by Letters Patent is,—

1. A chain shackle comprising a forged one-piece clevis having a pocket in its base portion the side walls of which diverge from the arms and the end walls of which converge from said arms to receive and support a chain link.

2. A chain shackle comprising a body provided with a chain link receiving pocket having ends and sides inwardly converging and diverging, respectively, and a link securing element extending through the sides of said pocket to retain the connected link in an upright position when the chain is relaxed.

3. In a device of the class described, a shackle having a base portion provided with a longitudinally elongated link receiving and supporting slot including converging ends to engage and support the ends of the connected link when the connected chain is relaxed, and a cross head and load supporting member swivelled in said shackle.

4. A chain shackle comprising a main body provided with a chain link receiving slot shaped pocket extending therethrough and having ends and sides inwardly converging and diverging, respectively, a link in said pocket, and a link securing element extending through said pocket and link, said pocket and securing elements conjointly holding said connected link in a centralized position when the connected hoist chain is slackened.

5. In combination, a shackle provided with an elongated head having a central longitudinal link receiving pocket extending therethrough and provided with converging ends, a hoist chain provided with a link extending into said pocket with the ends and sides adapted to be engaged by said converging ends of said pocket when the hoist chain is relaxed to centralize said connected link, and a cross bolt extending through said shackle head and securing said link in said pocket.

In testimony whereof I have affixed my signature.

DAVID W. JONES.